(12) United States Patent
Aikawa et al.

(10) Patent No.: US 11,774,000 B2
(45) Date of Patent: Oct. 3, 2023

(54) FLUID CONTROL DEVICE AND MANUFACTURING METHOD FOR THE FLUID CONTROL DEVICE

(71) Applicant: FUJIKIN INCORPORATED, Osaka (JP)

(72) Inventors: Kenji Aikawa, Osaka (JP); Tomohiro Nakata, Osaka (JP); Toshiyuki Inada, Osaka (JP); Akihiro Harada, Osaka (JP); Takahiro Matsuda, Osaka (JP); Tsutomu Shinohara, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 299 days.

(21) Appl. No.: 17/289,831

(22) PCT Filed: Oct. 18, 2019

(86) PCT No.: PCT/JP2019/041077
§ 371 (c)(1),
(2) Date: Apr. 29, 2021

(87) PCT Pub. No.: WO2020/090521
PCT Pub. Date: May 7, 2020

(65) Prior Publication Data
US 2021/0396326 A1    Dec. 23, 2021

(30) Foreign Application Priority Data
Oct. 31, 2018 (JP) ................................. 2018-204768

(51) Int. Cl.
*F16K 27/00* (2006.01)
*F15B 13/08* (2006.01)
*F16K 27/02* (2006.01)

(52) U.S. Cl.
CPC ........ *F16K 27/003* (2013.01); *F15B 13/0825* (2013.01); *F16K 27/0245* (2013.01)

(58) Field of Classification Search
CPC ........................... F16K 27/003; F15B 13/0825
See application file for complete search history.

(56) References Cited

U.S. PATENT DOCUMENTS 5,529,088 A * 6/1996 Asou ................... F15B 13/0857
                                                            137/271
5,765,591 A   6/1998 Wasson et al.
(Continued)

FOREIGN PATENT DOCUMENTS

CN          203210036 U      9/2013
CN          204139798 U      2/2015
(Continued)

OTHER PUBLICATIONS

International Search Report in Patent Application No. PCT/JP2019/041077, dated Dec. 24, 2019 (and translation thereof).
(Continued)

*Primary Examiner* — Michael R Reid
(74) *Attorney, Agent, or Firm* — Greenblum & Bernstein, P.L.C.

(57) ABSTRACT

A fluid control device includes: a joint block defining a fluid flow path open to an upper surface thereof, and which has an engaging portion on the bottom surface side thereof; a support member having a guide portion which restrains the joint block on the upper surface while permitting the joint block to move in longitudinal direction; and a fluid device fixed to the upper surface of the joint block. The support member is provided with at least one plunger such that the tip end portion protrudes from the upper surface of the support member. A recess is provided in the bottom surface of the joint block, and the recess engages with the tip end portion of the plunger to set the position of the joint block in the longitudinal direction.

6 Claims, 11 Drawing Sheets

(56) References Cited

U.S. PATENT DOCUMENTS

| | | | |
|---|---|---|---|
| 6,116,282 A | 9/2000 | Yamaji et al. | |
| 6,382,238 B2* | 5/2002 | Ishii | F16K 27/003 137/271 |
| 8,973,615 B2* | 3/2015 | Hoshi | F16K 27/003 248/225.11 |
| 2002/0031417 A1 | 3/2002 | Hoshi et al. | |
| 2019/0195378 A1 | 6/2019 | Aikawa et al. | |

FOREIGN PATENT DOCUMENTS

| | | |
|---|---|---|
| CN | 205660207 U | 10/2016 |
| CN | 205660488 U | 10/2016 |
| CN | 207853646 U | 9/2018 |
| CN | 207904623 U | 9/2018 |
| JP | 2002-206700 A | 7/2002 |
| JP | 2015-175502 A | 10/2015 |
| JP | WO2017/221891 A1 | 12/2017 |
| JP | WO2017/221893 A1 | 12/2017 |

OTHER PUBLICATIONS

Written Opinion in Patent Application No. PCT/JP2019/041077, dated Dec. 24, 2019 (and translation thereof).
Chinese Office Action in corresponding application No. 201980071903, dated Aug. 26, 2022.

\* cited by examiner

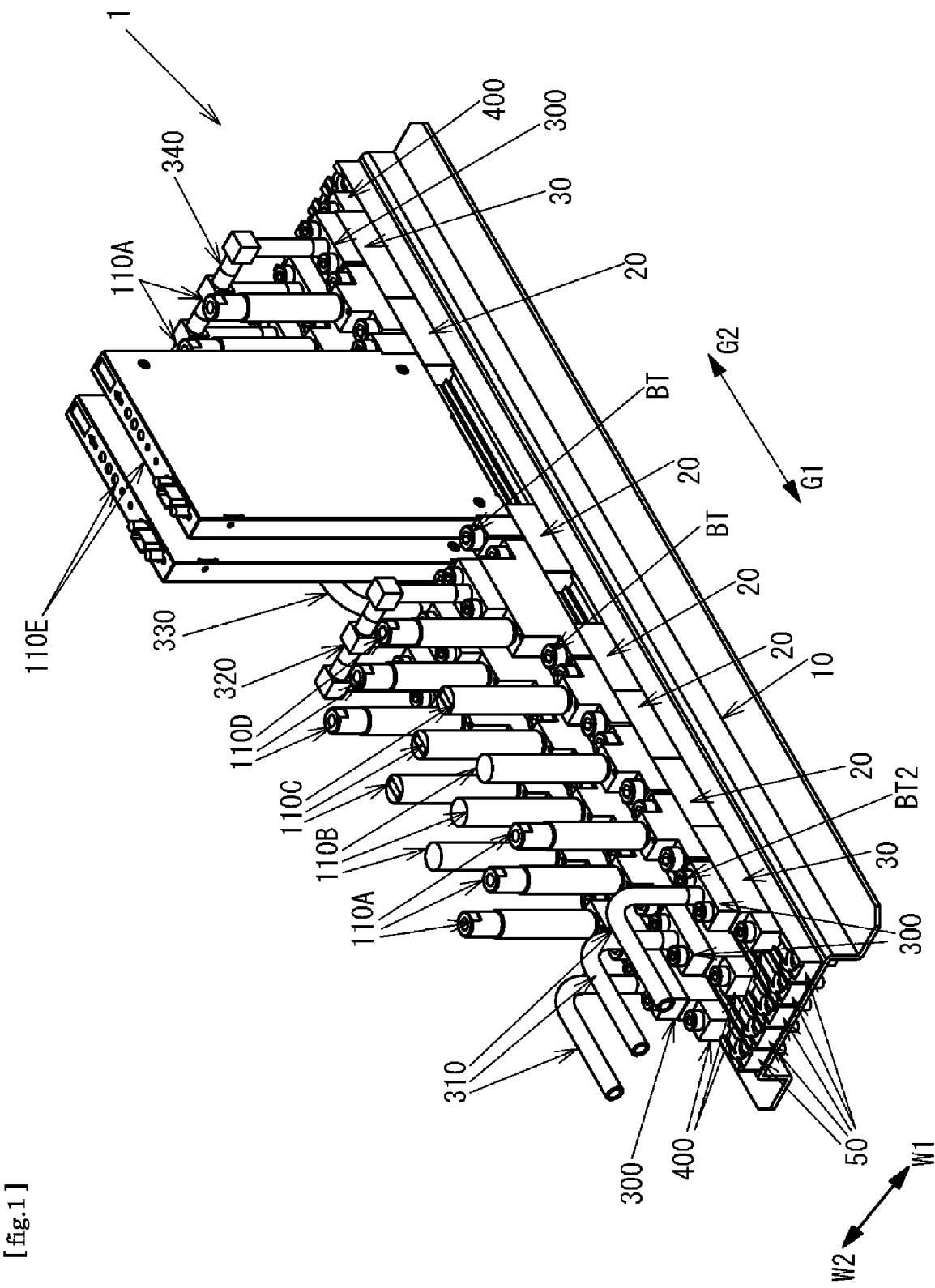
[fig.1]

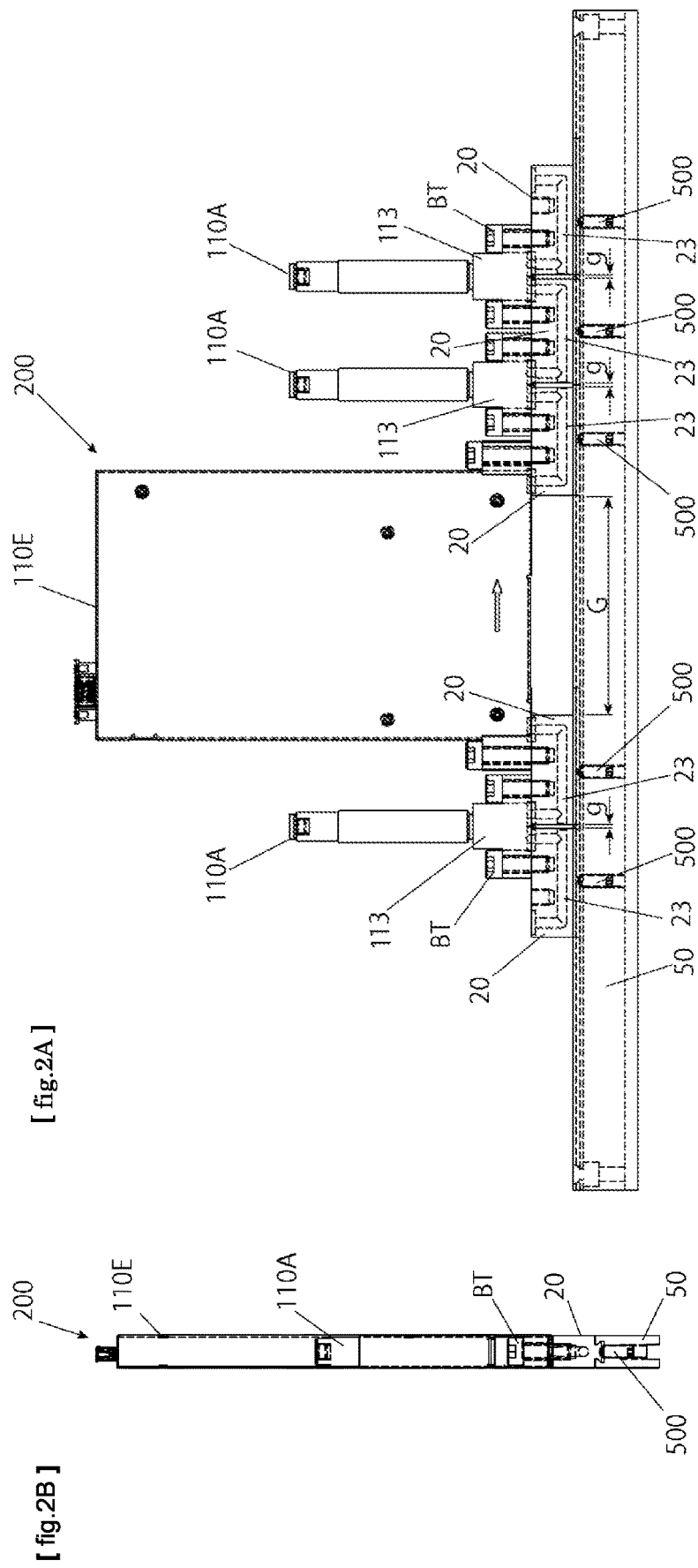

[fig.2C]
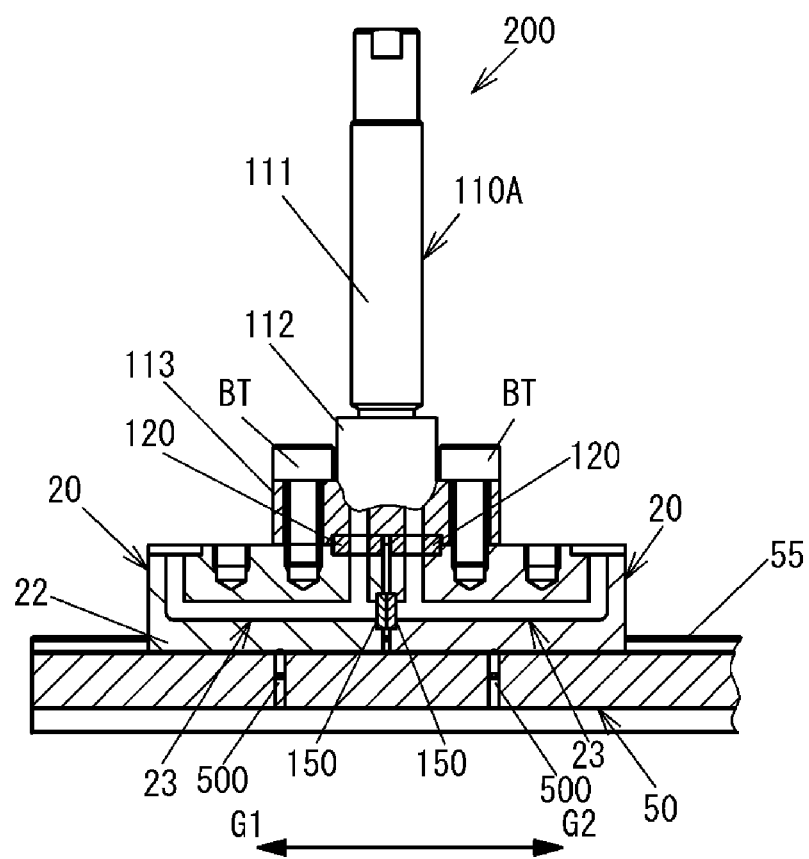

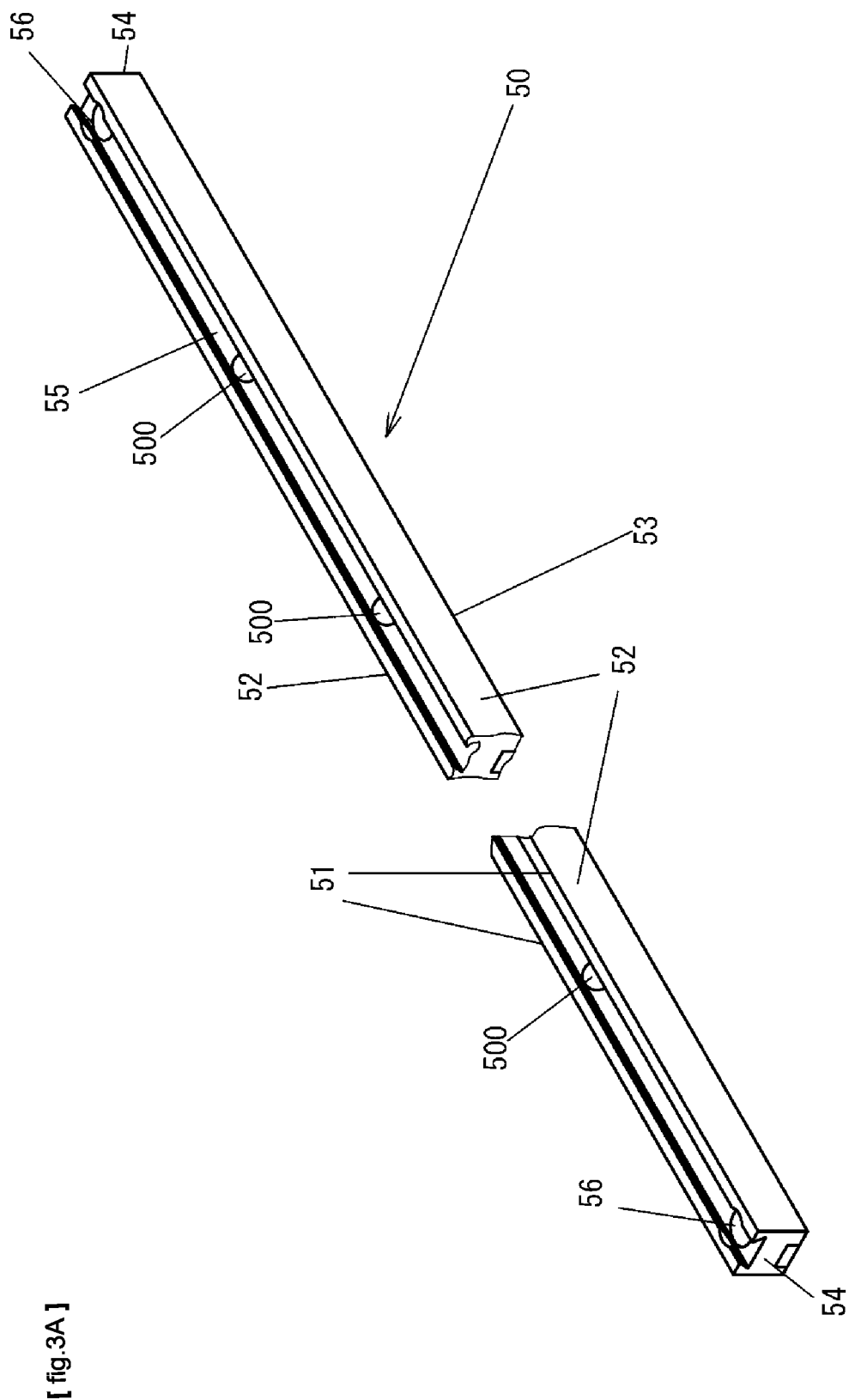
[fig.3A]

[fig.3B]
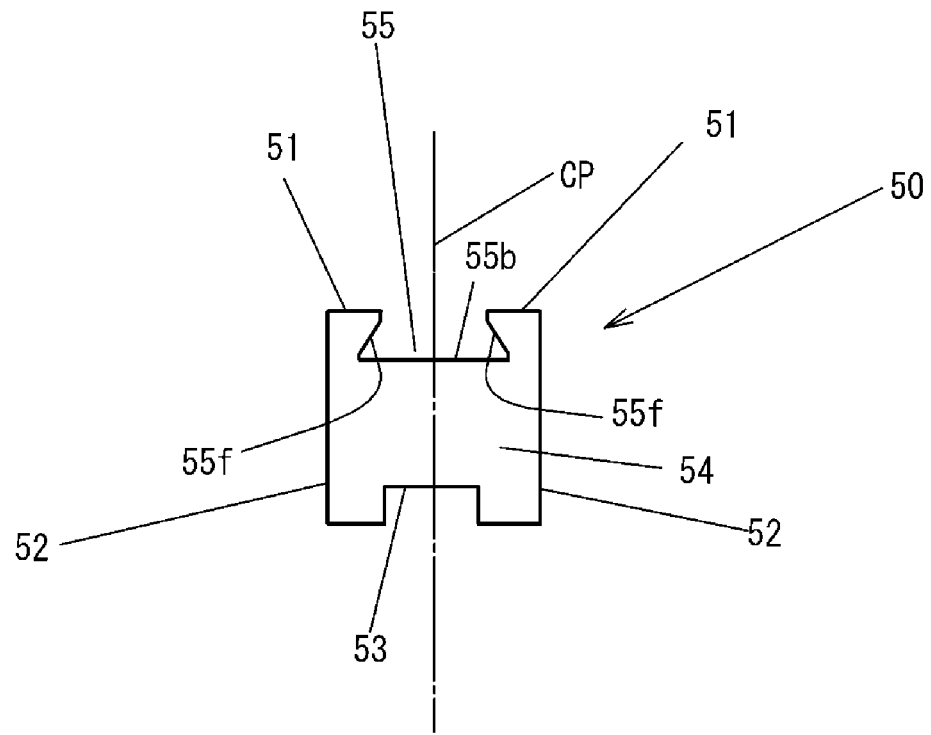
[fig.3C]
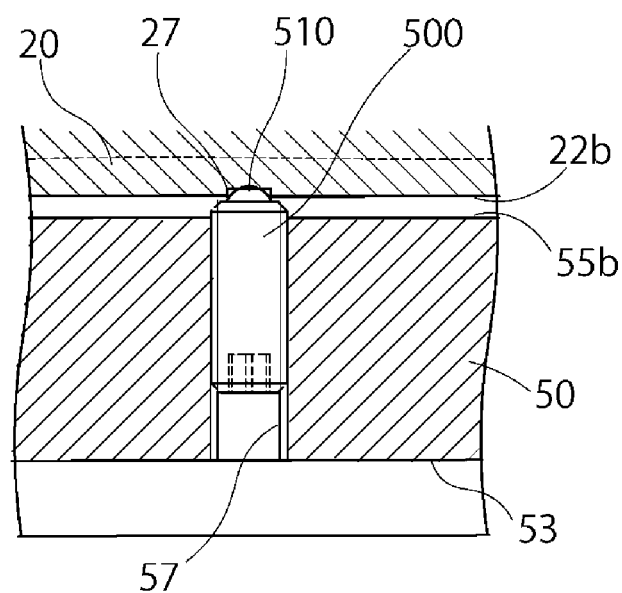

[fig.3D]
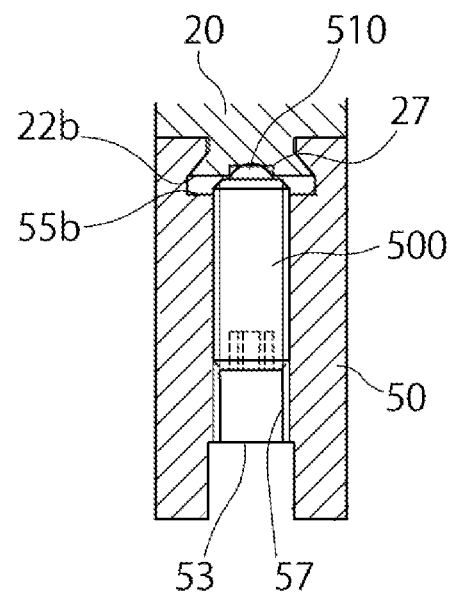
[fig.4]
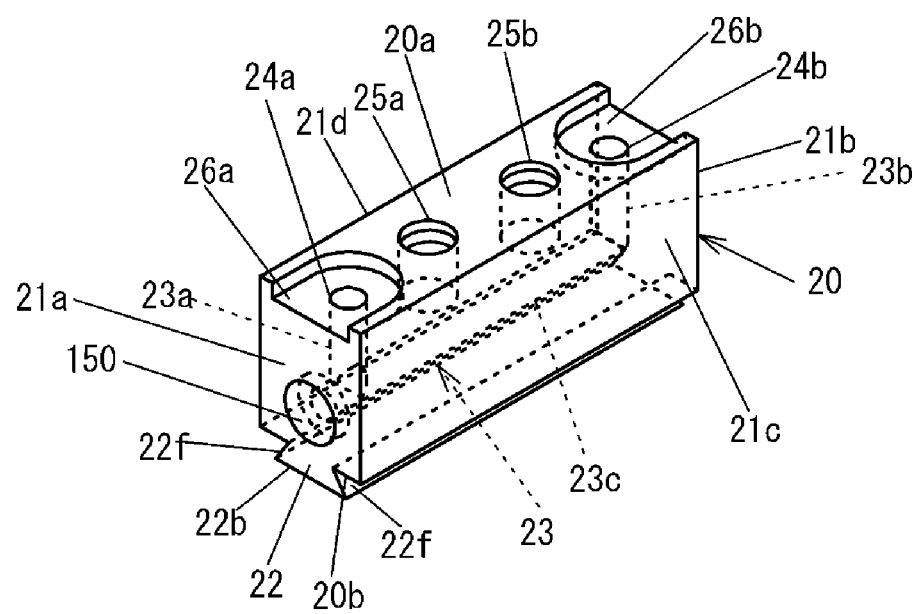

[fig.5A]
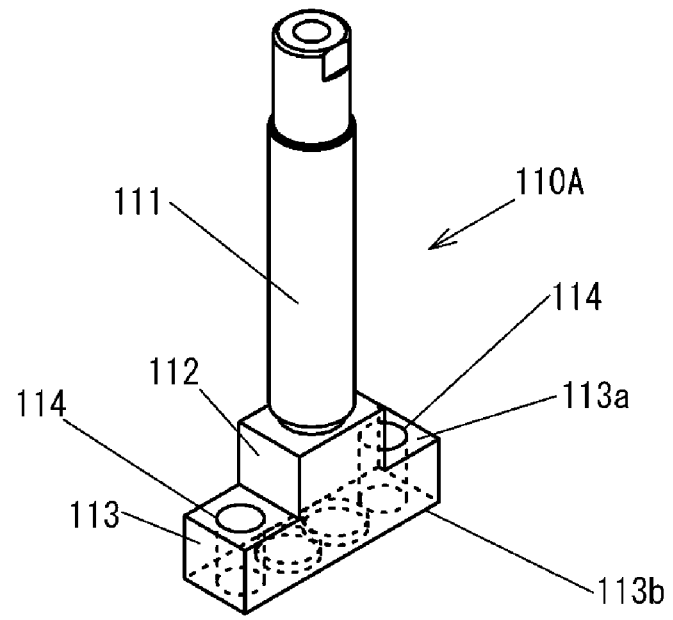
[fig.5B]
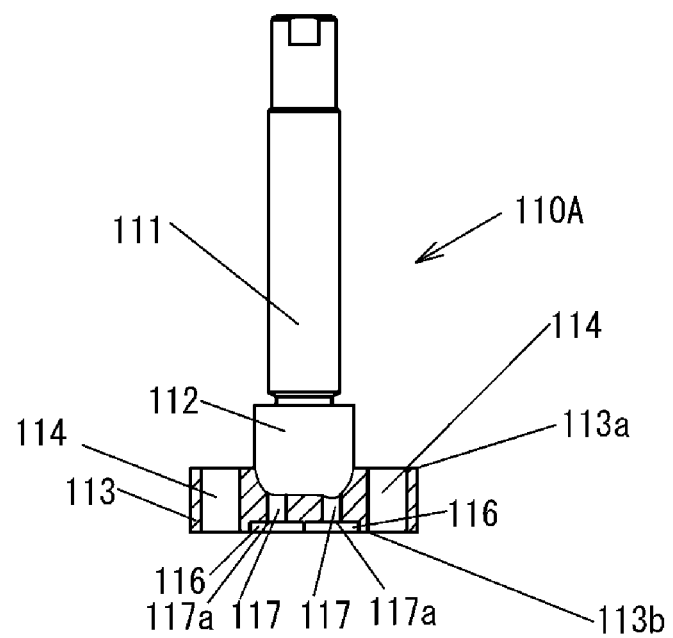

[fig.6A]
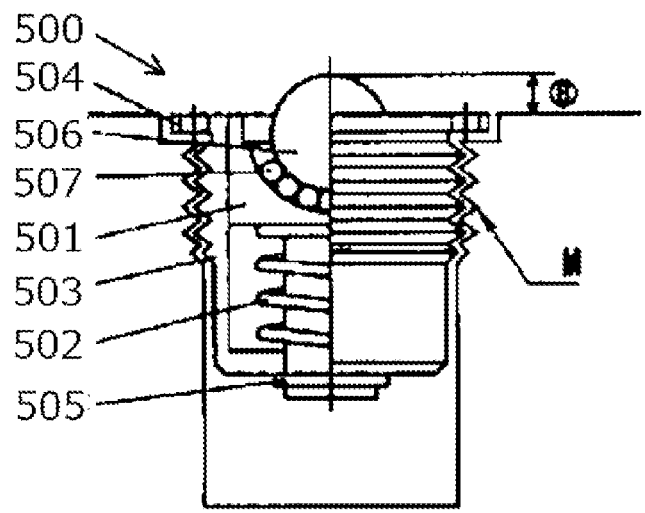
[fig.6B]
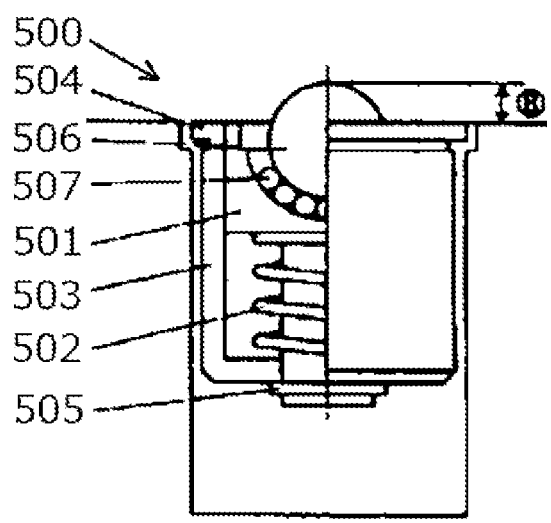

[fig.6C]
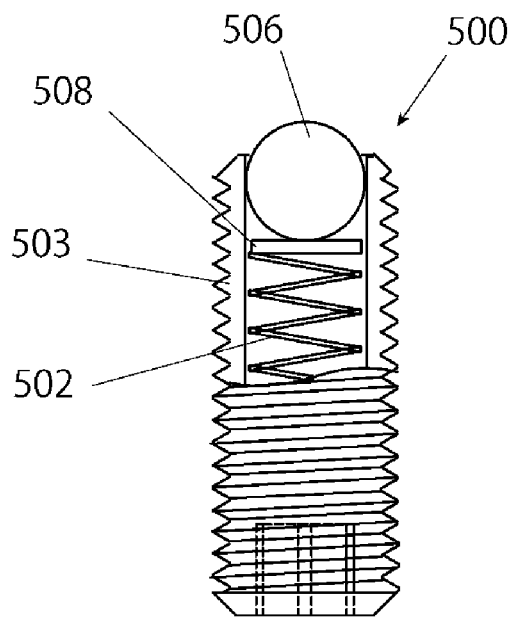

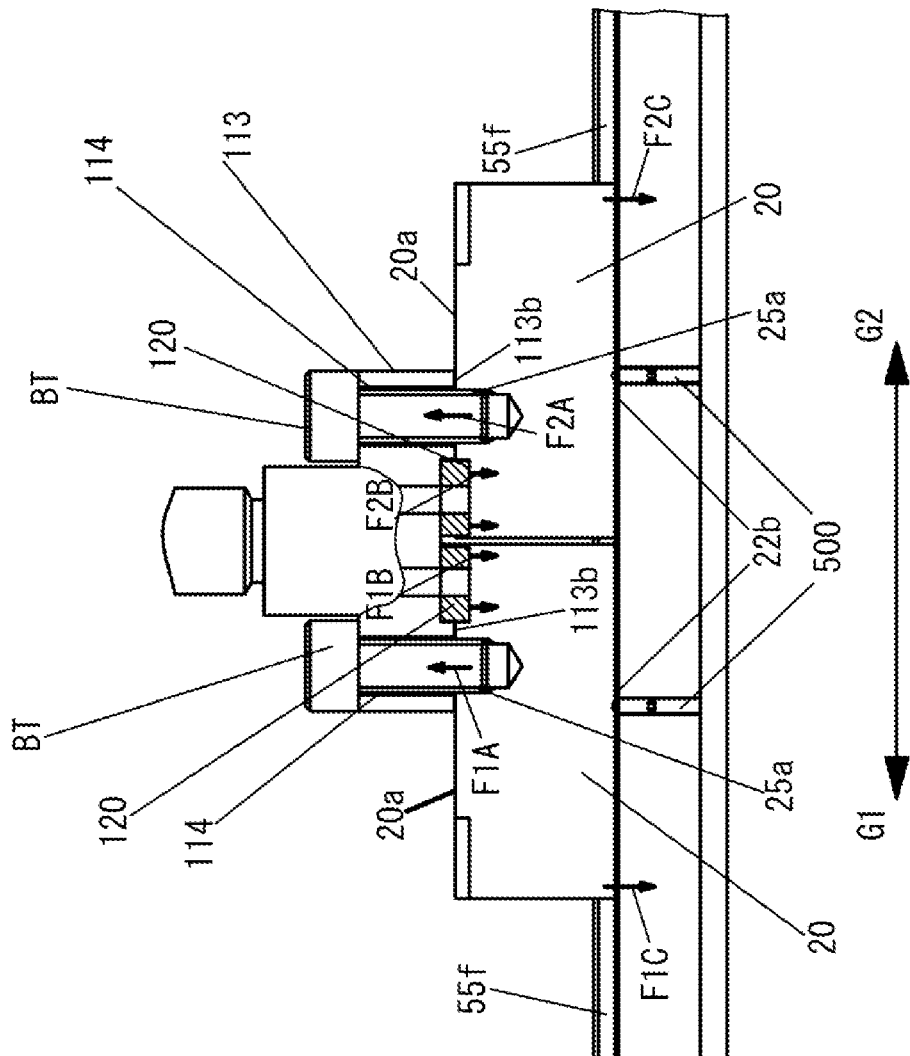
[fig.7]

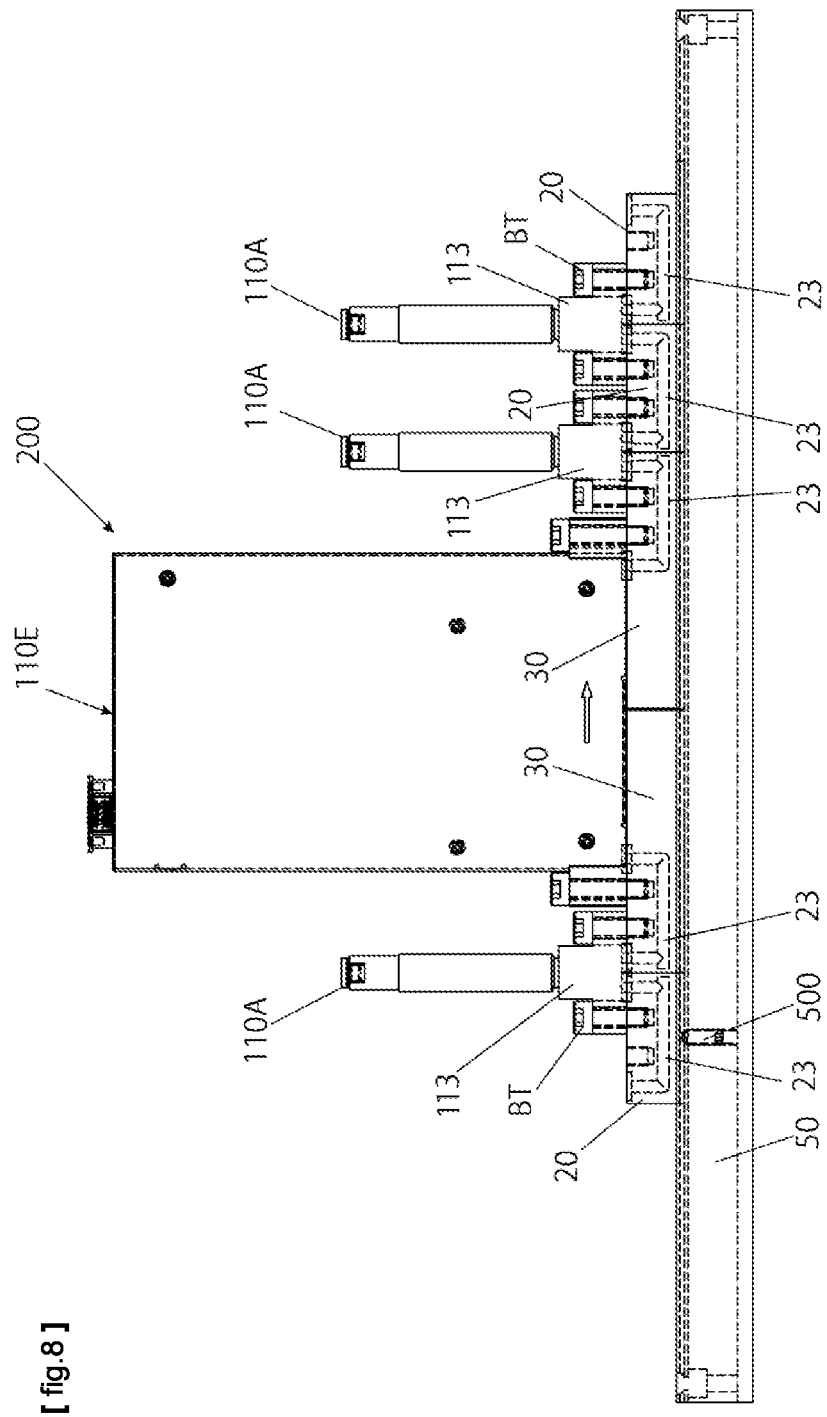

FLUID CONTROL DEVICE AND MANUFACTURING METHOD FOR THE FLUID CONTROL DEVICE

TECHNICAL FIELD

The present invention relates to a fluid control device in which fluid devices are integrated and a manufacturing method for the fluid control device.

BACKGROUND ART

As fluid control devices used for supplying various process gases to a chamber or the like of a semiconductor manufacturing apparatus or the like, fluid control devices are widely used, in which a plurality of fluid devices is arranged from upstream to downstream.

In the field of the fluid control device as described above, high responsiveness of process gas supply control is required, and for this purpose, fluid control device should be miniaturized and integrated as much as possible and installed closer to a chamber to which fluids are supplied.

Further, along with increase in the size of the object to be processed such as increase in the diameter of semiconductor wafers, it is necessary to increase the supply flow rate of the fluid supplied from the fluid control device into the chamber accordingly.

In many fluid control devices with a width of 1.125-inch (about 29 mm) that are currently manufactured, joint blocks are fixed to a sheet metal board with bolts, and each fluid device such as a valve is fixed to the joint blocks. However, in fluid control devices of 10 mm wide, which will become the mainstream in the future, the width is insufficient for joining them by bolts. For this reason, a construction has been proposed in which a rail is installed on a board, joint blocks are held longitudinally on the rail, and each fluid device is mounted on top of each joint block (see, e.g., Patent Literatures 1-4). As a result, fluid control devices are miniaturized and integrated without decreasing the flow rate of fluids, and assembly man-hours are reduced and a maintainability is improved.

Patent Literature

PTL 1: Japanese Laid-Open Patent Application No. 2002-206700
PTL 2: Japanese Laid-Open Patent Application No. 2015-175502
PTL 3: International Publication No. WO2017/221893
PTL 4: International Publication No. WO2017/221891

SUMMARY OF INVENTION

Technical Problem

The mechanism described above is an excellent mechanism in that a fluid device such as a valve can be arranged in a narrow width of 10 mm while maintaining ease of assembly and maintainability.

However, in a fluid control device assembly process that is generally performed with the rail set substantially in an upright position in order to prevent particles from entering to the inside, there is a problem that the joint blocks slide down along the rail when mounting fluid devices to the joint blocks. Therefore, it is necessary to fix each joint block from the side with a vise after positioning the joint block, and there is a problem that the assembly process is troublesome.

An object of the present invention is to provide a fluid control device and a manufacturing method for such a fluid control device, which solve the above-mentioned problems and realize further miniaturization and integration without reducing the flow rate of supplied fluids, and which reduce the number of assembly step.

Solution to Problem

The fluid control device of the present invention is a fluid control device comprising: a joint block defining an upper surface and a bottom surface opposing each other, side surfaces extending from the upper surface toward the bottom surface side, defining a fluid flow path which is open to the upper surface, and having an engaging portion on the bottom surface side;

a support member having a guide portion that extends linearly in a longitudinal direction adapted to be engaged with the engaging portion of the joint block, and restraining the joint block on an upper surface of the support member while allowing the joint block to move in the longitudinal direction by the guide portion; and a fluid device having at least two flow path ports that open on a bottom surface of the fluid device and fixed to the upper surface of the joint block so that the flow path ports are each connected to the fluid flow path of the joint block, wherein the support member is provided with at least one plunger so that a tip end portion of the plunger protrudes from the upper surface of the support member, a recess is provided in the bottom surface of the joint block, and the recess is engaged with the tip end portion of the plunger to set a position of the joint block in the longitudinal direction.

Preferably, a configuration may be adopted in which the plunger is provided for each joint block, and the joint blocks are positioned with a gap therebetween. This prevents friction between the joint blocks when attaching the fluid device to the joint blocks, and the generation of particles can be reduced.

Alternatively, a configuration may be adopted in which only one plunger is provided on the support member and all of the joint blocks are integrally positioned so that they are in contact with each other. Thus, for example, by positioning a joint block at the lowermost position when the sheet metal substrate is set in an upright position at the time of assembly by the plunger, and stacking each joint block thereon, all the joint blocks can be easily positioned.

Preferably, a configuration may be adopted in which the plunger is of a ball type. This configuration is preferable since it suppresses generation of particles by contact between the plunger and the joint block when the joint block moves to a predetermined position while contacting the plunger.

Preferably, a configuration may be adopted in which the fluid device has a body defining fluid flow paths, and the body has two flow path ports opening at its bottom surface, the joint blocks of upstream side and downstream side of the fluid device each has a screw hole formed from the upper surface toward the bottom surface side of the joint block, the screw hole being adapted to be screwed with a fastening bolt for connecting the body to the joint blocks of upstream side and downstream side while pressurizing a seal member disposed around each of flow path ports of the joint blocks of upstream side and downstream side and around each of the two flow path ports of the body, the screw hole of the joint block of upstream side is formed only on the upstream side of the flow path port of the upstream joint block in the longitudinal direction, the screw hole of the joint block of downstream side is formed only on the downstream side of the flow path port of the downstream joint block in the longitudinal direction, the joint blocks of upstream side and downstream side are fixed to the guide portion by utilizing a part of a reaction force against a bending force generated by the tightening force of the fastening bolt to the joint block of upstream side and downstream side and the body connected to each other. In this configuration, by positioning the joint block by the plunger and simply tightening the body of each fluid device to each joint block with bolts, they are preferably fixed to the guide member.

The method for manufacturing a fluid control device of the present invention is a method for manufacturing a fluid control device having the above-mentioned structure, and comprising the steps of:

providing at least one plunger on a support member so that a tip end portion protrudes from an upper surface of the support member, providing a recess on a bottom surface of a joint block, engaging the recess with the tip end portion of the plunger to set a position of the engaging member in the longitudinal direction, and tightening each joint block with each fluid device in this state.

Advantageous Effects of Invention

According to the present invention, since a plunger for positioning each joint block is provided, each joint block is disposed in the correct position while being engaged with the support member. Therefore, since it is not necessary to adjust the position of each joint block by measuring the position with a ruler or the like, the work efficiency is improved.

Further, since each of the positioned joint blocks is temporarily fixed by the plunger, even if each of the joint blocks is not fixed with a vise or the like, each fluid device can be mounted while the support member is set in an upright position so that the longitudinal direction of the support member is substantially vertical, thereby reducing the penetration of particles into flow path during operation.

Consequently, it is possible to realize a fluid control device that is further miniaturized and integrated without reducing the fluid supply flow rate, and a fluid control device that has reduced assembly man-hours and has improved maintenance performance.

BRIEF DESCRIPTION OF DRAWINGS

FIG. 1 is an external perspective view of a fluid control device according to a first embodiment of the present invention.

FIG. 2A is a front view of an assembly constituting a single line of the fluid control device in FIG. 1.

FIG. 2B is a side view of the assembly in FIG. 2A.

FIG. 2C is a partial cross-sectional view of a fluid device and its upstream and downstream joint blocks.

FIG. 3A is an external perspective view of a rail member.

FIG. 3B is a side view of the rail member in FIG. 3A.

FIG. 3C is a partial cross-sectional view along line D-D in FIG. 2A.

FIG. 3D is a partial cross-sectional view along line E-E in FIG. 2A.

FIG. 4 is an external perspective view of the joint block.

FIG. 5A is an external perspective view of an open-close valve.

FIG. 5B is a partial cross-sectional view of the body of the open-close valve in FIG. 5A.

FIG. 6A is a partial cross-sectional view showing an example of a plunger.

FIG. 6B is a partial cross-sectional view showing another example of the plunger.

FIG. 6C is a partial cross-sectional view showing still another example of the plunger.

FIG. 7 is a schematic diagram showing a state in which the assembly is tightened with a fastening bolt using the rail member.

FIG. 8 is a front view of an assembly constituting a single line of the fluid control device according to the second embodiment.

DESCRIPTION OF EMBODIMENTS

Embodiments of the present invention will be described below with reference to the drawings.

First Embodiment

In this embodiment, a plunger is provided at a position corresponding to each joint block to fix the position of each joint block. A plurality of screw holes for screwing the plunger may be provided in the rail member and select a screw hole to which the plunger should be screwed according to the position of the joint block.

As shown in FIG. 1, in the fluid control device 1, on a metallic base plate 10, there are provided five rail members 50 as support members extending in the longitudinal direction G1, G2 and arranged along the width direction W1, W2. Note that W1 represents the front side, W2 represents the back side, G1 represents the upstream side, and G2 represents the downstream side. Of the five rail members 50, various members are installed only in the rail members 50 at both ends and the center, and nothing is installed in the second and fourth rail members 50, resulting in an empty state. However, various members can be additionally installed on these two rail members 50, and if these two rail members 50 are not needed, they can be removed from the base plate 10 and the three rail members 50 at both ends and the center can be arranged side by side.

In the present invention, the rail member 50 to be attached to the base plate 10 is not limited to a plurality and it may be one, but the more the number is, the more advantageous effects of the present invention become remarkable.

As shown in FIG. 1, in each of the two rail members 50 disposed in the front side and the central portion, various fluid devices 110A to 110E are installed via a plurality of joint blocks 20 and 30, and the plurality of joint blocks 20 and 30 form a flow path through which fluids flow from the upstream side to the downstream side. In the rail member 50 on the rear side, fluid devices other than fluid device 110E, that are fluid devices 110A to 110D and a communication pipe 330, are installed via a plurality of joint blocks 20 and 30, and a flow path through which fluids flows from the upstream side to the downstream side is formed.

The term "fluid device" as used herein refers to a device used in a fluid control device for controlling a flow of fluids, comprising a body defining a fluid flow path and having at least two flow path ports open at a bottom surface of the body. Specifically, an open-close valve (2-way valve) 110A, a regulator 110B, a pressure gauge 110C, an open-close valve (3-way valve) 110D and a mass flow controller 110E or the like are included, but not limited thereto.

An introduction pipe 310 is connected by a joint member 300 to an upstream side flow path port of two flow path ports (not shown) formed in the joint block 30. A seal member (not shown) is interposed between the joint member 300 and the joint block 30. Examples of the seal member include gaskets made of metal or resin.

By tightening the two fastening bolts BT2 on both sides of the gasket (not shown), the gasket is pressed and an interface between the joint member 300 and the joint block 30 is sealed. Since the configuration of the fluid flow path formed in the joint block 30 is the same as the joint block 20 to be described later, a description thereof will be omitted here. A flow path port (not shown) on the downstream part of the joint block 30 is connected to the open-close valve 110A. The connection structure of this portion is the same as the connection structure of the joint blocks 20 with fluid devices 110A to 110E to be described later, a description thereof will be omitted.

For example, into flow paths of the three lines of the fluid control device 1, a process gas such as ammonia gas is introduced through an introduction pipe 310 on the front side, a process gas such as hydrogen gas is introduced through an introduction pipe 310 at the center, and a purge gas such as nitrogen gas is introduced through an introduction pipe 310 on the back side.

Three open-close valves (three-way valves) 110D are connected to each other by a communication pipe 320 so that a purge gas can be introduced into the flow path of the process gas.

A communication pipe 330 is provided in the middle of the flow path instead of the mass flow controller 110E because the mass flow controller 110E is not required for a flow path line of the purge gas.

A supply pipe 340 connects three joint members 300 disposed on the downstream side, and is connected to a processing chamber (not shown).

At the upstream and downstream ends of each of the front side, the center side and the rear side lines, stoppers 400 are fixed to the bottom surface of the guide portion 55 by fastening bolts BT2, which restrict movements in the longitudinal directions G1 and G2 of fluid devices 110A to 110E connected to each other in each flow path line. The stoppers 400 can appropriately change or adjust the fixed position according to the number of fluid device or the like.

FIGS. 2A to 2C are diagrams showing an example of an assembly 200 constituting a single flow path line of the fluid control device 1, FIG. 2A is a front view, FIG. 2B is a side view, and FIG. 2C is a partial cross-sectional view of the fluid device 110A constituting a part of the assembly 200 in FIG. 2A and its upstream and downstream joint blocks 20. The assembly 200 constituting this single line actually includes various fluid devices like one line of the fluid control device 1 in FIG. 1, but it is simplified in FIG. 2A for illustrative purposes.

The assembly 200 shown in FIG. 2A has a rail member 50, five joint blocks 20 disposed on the rail member 50, and an open-close valve 110A and a mass flow controller 110E as fluid devices each arranged so as to straddle a gap between adjacent joint blocks 20. That is, the joint blocks 20 and the fluid devices (110A or 110E) are connected alternately, an assembly of single line is configured with the engaging rail member 50. As shown in FIG. 2C, a flow path of the open-close valve 110A and the flow paths 23 of the joint blocks 20 upstream and downstream of the flow path of the open-close valve 110A are connected. These Flow paths 23, as shown in FIG. 2A, communicate with the fluid devices (110A or 110E) on both sides, and constitutes a flow path of a single line.

The joint blocks 20 are arranged with a small gap g under each open-close valve 110A and a large gap G under the mass flow controller 110E. Thus, when connecting the joint blocks 20 to the fluid devices (110A or 110E), it is possible to prevent the neighboring joint blocks 20 from fractioned to each other to generate particles.

FIG. 3A is an external perspective view showing the rail member 50.

Rail member 50 is, for example, a long member made of a metal such as a stainless steel alloy, has a rectangular cross section, and defines an upper surface 51, two side surfaces 52 perpendicular thereto, a bottom surface 53 parallel to the upper surface 51 and orthogonal to the side surface 52, and end faces 54 at both ends in the longitudinal direction. On the upper surface 51, a guide portion 55 is formed in a groove shape extending in the longitudinal direction. The guide portion 55, as shown in FIG. 3B, is formed symmetrically with respect to an imaginary central plane CP extending longitudinally through the central position of the upper surface 51 and the bottom surface 53 of the rail member 50, and the guide portion 55 has a bottom surface 55b and two receiving surfaces 55f which are inclined diverging toward the bottom surface 55b. The two receiving surfaces 55f are inclined in opposite directions. The receiving surfaces 55f are inclined at an angle of about 57 degrees with respect to the bottom surface 55b but the angle is not limited thereto. The upper surface 51 of the rail member 50 functions as a support surface capable of supporting the joint blocks 20. In the longitudinal ends of the bottom surface 55b of the guide portion 55, through holes 56 for fastening bolts for fixing the rail member 50 to the base plate 10 are formed. The dimensions of the rail member 50 are about 10 mm in the width and height, and about 300 mm in total length, but they are not limited thereto. The stopper 400 can be fixed to any position along the length of the guide portion 55 by a fastening bolt BT2, and a well-known fastening bolt can be adopted, and therefore, detailed explanation thereof is omitted.

Substantially on a central axis of the rail member 50, at intervals obtained by adding a gap g or G (see FIG. 2A) to the length of the joint block 20, screw holes 57 (see FIG. 3D) each penetrating from the bottom surface 53 of the rail member 50 to the bottom surface 55b of the guide portion 55 are provided, and plungers 500 are screwed into them. Thus, each screw hole 57 for screwing the plunger 500 may be provided to the rail member 50 at a position corresponding to the position of a joint block 20 to be arranged. As an alternative, a plurality of screw holes for screwing the plunger 500 may be provided to the rail member 50 so that a screw hole 57 with which the plunger 500 is screwed may be selected according to the position of the joint block. A rail member 50 having such a configuration can correspond to various arrangements of the joint blocks 20 and fluid devices 110A to 110E.

FIGS. 3C and 3D are longitudinal and widthwise cross-sectional views, respectively, of a portion of the rail member 50 including the plunger 500. For convenience of explanation, they each shows a state in which the joint block 20 is engaged. As shown in FIGS. 3C and 3D, the plunger 500 is provided so that the tip end portion 510 protrudes from the bottom surface 55b of the guide portion 55 (upper surface of the support member), a recess 27 is provided in the bottom surface 22b of the engaged joint block 20, and the recess 27 is engaged with the tip end portion 510 of the plunger 500, whereby the longitudinal position of the joint block 20 is positioned.

The internal structure of the plunger 500 will be described later.

FIG. 4 is an external perspective view showing a joint block 20.

The joint block 20 is a member of a metal such as a stainless steel alloy, and has a flat upper surface 20a and a flat bottom surface 20b facing each other and four sides 21a, 21b, 21c, 21d respectively perpendicular to the upper surface 20a. Of the four side surfaces 21a, 21b, 21c, 21d, two adjacent side surfaces are perpendicular to each other. Side surfaces 21a, 21b are planes located at both ends in the longitudinal direction, the side surfaces 21c, 21d are planes extending in the longitudinal direction. Incidentally, the joint block 20 can also be adopted other shapes although the case of a rectangular parallelepiped shape as an example.

The bottom surface 20b functions as a supported surface supported by upper surface 51 of the rail member 50, the engaging portion 22 is integrally formed so as to protrude from the bottom surface 20b. The engaging portion 22 is formed in a divergent shape downward from the bottom surface 20b, and has engaging surfaces 22f which are inclined in opposite directions to each other. The engaging portion 22 is formed symmetrically, the inclination angle of the engaging surfaces 22f with respect to the bottom surface 22b is substantially the same angle as the receiving surfaces 55f of the rail member 50, but the angle is not limited thereto. The engaging portion 22 has a shape to be fitted to the guide portion 55 of the rail member 50, and can be inserted from both ends in the longitudinal direction of the rail member 50. The guide portion 55 restrains the joint block 20 on the rail member 50 while allowing longitudinal movement of the engaging portion 22.

The flow path 23 defined by the joint block 20 includes a first vertical flow path 23a extending from the upper surface 20a toward the bottom surface 20b side and having an flow path port 24a opening at the upper surface 20a, a second vertical flow path 23b extending from the upper surface 20a toward the bottom surface 20b side and having an flow path port 24b opening at the upper surface 20a at a position spaced apart from each other in the longitudinal direction, and a horizontal flow path 23c extending longitudinally linearly inside the joint block 20 and connected to the first and second vertical flow paths 23a, 23b. The opening of the side surface 21a generated when the horizontal flow path 23c is formed is closed by fitting a closing member 150. As a result, a U-shaped flow path including the first and second vertical flow paths 23a and 23b and the horizontal flow path 23c is formed.

Holding recesses 26a and 26b for holding gaskets 120 are formed around the flow path ports 24a and 24b that open on the upper surface 20a side of the joint block 20, respectively. On the outer periphery of the flow path ports 24a and 24b of the bottom surface of 26b, although not shown, an annular projection hardened to sufficiently higher hardness than the gasket 120 in order to crush the gasket 120 may be formed.

Screw holes 25a and 25b are positioned above the horizontal flow path 23c. The screw hole 25a is for connecting to a fluid device (not shown) on the left side of FIG. 4 with one bolt BT, and at this time, the flow path port 24a is connected to the flow path port of the fluid device (not shown). Similarly, the screw hole 25b is for connecting to the fluid device (not shown) on the right side of FIG. 4 with and one bolt BT, and at this time, the flow path port 24b is connected to a flow path port of the fluid device (not shown). Therefore, considering a case of connecting joint blocks 20 on both sides (assuming the left side upstream) of a fluid device (110A to 110E), the screw hole 25b of an upstream joint block 20 is formed only on the upstream side than the flow path port 24b in the longitudinal direction, and the screw hole 25a of a downstream joint block 20 is formed only on the downstream side than the flow path port 24a in the longitudinal direction.

As for the dimensional specifications of the joint block 20, the distance from the side surface 21a or 21b which is the end face in the longitudinal direction of each of the joint blocks 20 and 30 to each of the center of the screw hole 25a or 25b (see FIG. 4) for the bolt BT for attaching the fluid devices 110A to 110E is set to be ½ of the dimension obtained by subtracting the gap g from the distance between the centers of the through holes 114 (see FIG. 5A) of the fluid device 110A to 110E, so that the fluid devices 110A to 110E can be connected correctly when the joint blocks 20 are arranged with a gap g to each other.

Here, the bottom surface 22b of the joint block 20 is provided with a recess 27 (see FIGS. 3C and 3D) in which the tip end portion of the plunger 500 is to be engaged. The recess 27 is a cylindrical hole in the present embodiment, but it may be a conical recess or a groove extending in the width direction. The recess 27 is formed to have a depth such that a ball or the like forming tip end portion of the plunger is engaged to position the joint block with respect to a rail, and the engagement can be manually released by a thrust force of about 0.1 to 10N (about 0.01 to 1 kgf).

FIG. 5A is a perspective view showing an open-close valve (fluid device) 110A, and FIG. 5B is a partial cross-sectional view of its body.

The open-close valve 110A includes an actuator built-in portion 111, a valve built-in portion 112 and the body 113, and is configured to be supported by the rail member 50 via the joint blocks 20.

The width of the body 113 is matched to the width of the joint block 20, and is, for example, about 10 mm, but is not limited thereto.

The body 113 defines a fluid flow path 117 having two flow path ports 117a opening on the bottom surface 113b side, and two flow path ports 117a are formed with holding recesses 116 for holding gaskets 120, respectively. Although not shown, a annular protrusion hardened to have a hardness sufficiently higher than that of the gasket 120 for crushing the gasket 120 may be formed in the holding recess 116.

At both longitudinal ends of the body 113, through holes 114 for inserting fastening bolts BTs are formed from the upper surface 113a toward the bottom surface 113b.

FIGS. 6A to 6C are partial cross-sectional views illustrating exemplary plungers 500.

FIG. 6A and FIG. 6B are examples of the plunger structures shown in FIG. 2 of Japanese Laid-Open Patent Application No. 2003-239952, which are plungers mounted from above. The plunger 500 in FIG. 6A is a screw type, has a screw thread on the outer periphery of the casing 503, and is a type to be screwed into a screw hole of an object to which the plunger is mounted, whereas the plunger 500 in FIG. 6B is a screwless type and the outer periphery of the casing 503 is a cylindrical surface without screws, and is a type that is fitted into a straight hole of an object to which the plunger is mounted. In both types, rolling friction is reduced by incorporating a number of sub-balls 507 into the bottom of the main ball 506 inside the ball roller body 501. By inserting the ball roller body 501 and the spring 502 into the casing 503 and attaching a C-ring 505, while holding the rotating ball, the stroke operation is enabled by the spring 502. The casing 503 has a flange portion 504 so that the amount of protrusion of the main ball 506 from the surface of the object to which the plunger is mounted can be controlled.

FIG. 6C is an example of a type of plunger structure which is mounted from below. The plunger 500 has a screw thread on the outer periphery of the casing 503, and a hexagonal hole for HEX wrench is provided at the rear end portion of the casing 503, and it can be mounted by screwing from below into a threaded through hole of an object to which the plunger is mounted. Inside the casing 503, a spring 502, a spacer 508 and a main ball 506 are disposed so that the main ball 506 protruding from a tip end portion of the casing 503 can be rotated and stroked. However, this type of plunger 500 does not have sub-balls.

The plungers 500 are not limited to those shown in the above FIGS. 6A to 6C, and any plungers may be used as long as they can be disposed in the grooves of the rail members 50, and they may be commercially available plungers. However, from the viewpoint of reducing the sliding frictions between tip end portion of the plungers 500 and the joint blocks 20 to suppress the generation of particles, ball types as shown in FIGS. 6A to 6C is preferable, and types having sub-balls 507 in addition to the main ball 506 as shown in FIGS. 6A and 6B are particularly preferable.

Next, referring to FIG. 2A, a method for assembling an assembly of each line will be described, which constitutes a part of the manufacturing method of the fluid control device of the present embodiment configured as described above.

(1) Insertion of Joint Blocks into Rail Member

First, joint blocks 20 are inserted from an end of rail member 50 in the order in which they are arranged so that their engaging portions 22 (see FIG. 4) engage with the guide portion 55 (see FIG. 3A) of the rail member 50. When a joint block 20 is inserted to a predetermined position, a recess 27 (see FIGS. 3C and 3D) provided in the bottom engages with the tip end portion of a plunger 500 to position the joint block 20, and when the joint block 20 is further pushed in, it is positioned by being engaged with the tip end portion of a next plunger 500. The joint block 20 is push until it engages with the tip end portion of a predetermined plunger 500. In this way, all joint block 20 are pushed into its respective predetermined positions until they are engaged with the tip end portions of the plungers 500. Thus, all joint blocks 20 are disposed at correct positions with a predetermined gap. Therefore, since it is not necessary to measure the position of each joint block 20 with a ruler or the like to position the joint block, the work efficiency is improved.

In addition, it is desirable to perform this operation while the rail member 50 is set in an upright position so that the longitudinal direction of the rail member 50 is substantially vertical from the viewpoint of preventing the entry of particles into the flow path. At that time, even without fixing each joint block 20 with a vice or the like, each joint block 20 does not slip down, so that the work efficiency is improved.

(2) Connection of Joint Blocks to Fluid Devices

By inserting bolts BT into through holes in the body part of each fluid device (110A or 110E), screwing the bolts BT with screw holes of the joint blocks 20 and tightening the bolts BT, the joint blocks 20 are connected to the fluid device (110A or 110E).

In the present embodiment, as described in the above [0023], with reference to one fluid device (110A to 110E), the screw hole 25b of the joint block 20 on the upstream side is formed only on the upstream side than the flow path port 24b in the longitudinal direction, the screw hole 25a of the joint block 20 on the downstream side is formed only on the downstream side than the flow path port 24a in the longitudinal direction. Therefore, when the fastening bolts BT inserted through the through holes 114 of the body 113 and screwed with the screw holes 25a of the upstream and downstream joint blocks 20 are tightened, as shown in FIG. 7, on the upstream side and downstream side joint blocks 20, the pulling forces in the direction indicated by the arrows F1A and F2A act on the screw hole 25a, and the downward forces indicated by the arrows F1B, F2B act on the gasket 120. As a result, the bending force (bending moment) to incline the upstream joint block 20 and the downstream joint block 20 in opposite directions to each other acts. Then, the upstream and downstream joint blocks 20 receive a reaction force in the downward directions shown by the arrows F1C, F2C from the receiving surface 55f of the guide portion 55 of the rail member 50 against the bending moment, and the bottom surface 113b of the body 113 and the upper surface 20a of the two joint blocks 20 substantially touch each other. Thus, the joint blocks 20 are locked to the rail member 50 and fixed together with the fluid devices 110A to 110E.

According to the first embodiment, since the plunger 500 for positioning each joint block 20 is provided, each joint block 20 is disposed in the correct position with a predetermined gap while being engaged with the rail member 50. Therefore, since it is not necessary to measure the position of each joint block 20 with a ruler or the like to position the joint block 20, the work efficiency is improved.

Further, since each joint block 20 positioned is temporarily fixed by the plunger 500, even without fixing the joint blocks 20 with a vice or the like, each fluid device 110A to 110E can be attached in a state where the rail member 50 is set in an upright position so that the longitudinal direction of the rail member 50 is substantially vertical, it is possible to reduce the intrusion of particles into the flow path during operation.

Further, as described above, since the joint blocks 20 are arranged with a predetermined gap, when coupling the joint blocks 20 to the fluid device 110A to 110E, the joint blocks 20 are not frictioned with each other, and generation of particles due to this can be prevented.

Further, in the present embodiment, the screw hole 25b of the upstream joint block 20 is formed only on the upstream side than the flow path port 24b in the longitudinal direction, and the screw hole 25a of the joint block 20 on the downstream side is formed only on the downstream side than the flow path port 24a in the longitudinal direction. Therefore, since the joint block 20 is locked to the rail member 50 by the bending moment generated by the reaction force of the gasket (seal member) 120 when bolting fluid devices 110A to 110E to joint blocks 20, fixing of the fluid devices 110A to 110E to the joint blocks 20 and fixing of the joint blocks 20 to the rail member 50 can be achieved at one time. Therefore, combined with the efficiency improvement of the positioning operation of the joint block 20 by the plunger 500, the efficiency of the assembly operation is greatly improved.

In the present embodiment, the joint blocks 20 having the same dimensions are employed, but ones having various dimensions may also be employed.

Second Embodiment

In this embodiment, only one plunger is provided to each rail member 50 (support member), and all the joint blocks are arranged in contact with each other and integrally positioned.

FIG. 8 is a front view showing an assembly 200 constituting one line of the fluid control device of the present embodiment. In the present embodiment, the plunger 500 is provided only one, and the plunger 500 is engaged with a recess 27 of the leftmost (upstream side) joint block 20 among joint blocks 20 and 30 engaged with the rail member 50, to position the joint block 20. All other joint blocks 20 and 30 are arranged in contact with each other starting from the leftmost joint block 20.

In the present embodiment, not only short joint blocks 20 but also a long joint block 30 are arranged so that the joint blocks 20 and 30 are in contact with each other even below a mass flow controller 110E which is a large fluid device. In order to realize correct positioning by mutual contact, the distance to the center of the screw hole 25a or 25b (see FIG. 4) for the bolt BT for attaching the fluid devices 110A to 110E from the side surface 21a or 21b (see FIG. 4) which is the longitudinal end face of each joint block 20 or 30 is set to be ½ of the center-to-center distance of the through holes 114 (see FIG. 5A) of the fluid device 110A to 110E.

On the joint blocks 20 and 30 thus arranged, the fluid devices 110A to 110E are arranged and fastened with the joint blocks 20 and 30 by bolts BT.

Other configurations are the same as those of the first embodiment.

Next, referring to FIG. 8, a method for assembling an assembly of each line will be described, which constitutes a part of the manufacturing method of the fluid control device of the second embodiment configured as described above.

(1) Insertion of Joint Blocks into Rail Member

First, in the same manner as the first embodiment, joint blocks 20 and 30 are inserted from an end of rail member 50 in the order in which they are to be arranged so that their engaging portions 22 (see FIG. 4) engage with the guide portion 55 (see FIG. 3A) of the rail member 50. When a leading joint block 20 is inserted to a predetermined position, a recess 27 (see FIGS. 3C, 3D) provided in the bottom engages with the tip end portion of the plunger 500 to position the joint block 20. Next, subsequent joint block 20, 30 is inserted until it abuts the first joint block 20, 30. In this way, each joint block 20, 30 is inserted until it abuts the prior plunger. Thus, all joint blocks 20, 30 are arranged in contact with each other at correct positions.

(2) Connection of Joint Blocks to Fluid Device

By inserting bolts BT into through holes in the body part of each fluid device (110A or 110E), screwing the bolts BT with screw holes of the joint blocks 20 and tightening the bolts BT, the joint blocks 20 are connected to the fluid device (110A or 110E).

Similar to the first embodiment, by fastening the fluid devices 110A, 110E to the joint blocks 20, 30, the joint blocks 20, 30 are locked to the rail member 50 and is finally fixed.

According to the second embodiment, since only one plunger 500 is provided on the rail member 50 (support member) and all joint blocks 20 and 30 are integrally positioned in a state that they are in contact with each other, it is not necessary to measure the positions of the joint blocks with a ruler or the like to position the joint blocks 20 and 30, and the work efficiency is improved like the first embodiment. In particular, if a joint block 20 or 30 that is in the lowermost position when the rail member 50 is upright at the time of assembly is positioned by the plunger 500, by stacking other joint blocks 20 and 30 thereon, all joint blocks 20 and 30 can be easily positioned.

In addition, since the number of plungers 500 is small, there is also an advantage of low cost.

In this embodiment, unlike the first embodiment, since the neighboring joint blocks 20 and 30 are in contact, there is a demerit that the joint blocks 20 and 30 may friction against each other to generate particles at a time of connecting the joint blocks 20 and 30 to the fluid devices 110A to 110E. If the fluid control device specification is relatively loose and critical performance is not required, it may be desirable from a viewpoint of cost performance.

Incidentally, in the first embodiment, joint block 20 are positioned by respective plungers 500, and in the second embodiment, all joint blocks 20 and 30 are positioned by one plunger, but their intermediate configuration may be adapted, in which, for example, the plurality of joint blocks 20 and 30 are divided into two groups, and two plungers 500 for respective groups position all joint blocks 20 and 30 of the respective groups.

Further, in the above embodiments, the joint blocks 20, 30 are positioned by the plunger 500, and the joint blocks 20 and 30 are locked to the rail member 50 by tightening the fluid devices 110A and 110E to the joint blocks 20 and 30, so that the joint blocks 20 and 30 are finally fixed. But the configuration is not limited to this, the configuration may be such that the assembly of a series of joint blocks 20 and 30 and the fluid devices 110A and 110E are sandwiched by stoppers 400 (see FIG. 1) from upstream and downstream sides, or the configuration may be such that the holding force of the plunger 500 is increased to finally fix the joint block only by the plunger 500 even if the above locking function does not work.

REFERENCE SIGNS LIST

1: Fluid control device
10: Base plate
20: Joint block
20a: Upper surface
20b: Bottom surface
21a-21d: Side surface
22: Engaging portion
22b: Bottom surface
22f: Engaging surface (alignment mechanism)
23: Fluid flow path
23a, 23b: Vertical flow path
23c: Horizontal flow path
24a, 24b: Flow path port
25a, 25b: Screw hole
26a, 26b: Holding recess
27: Recess
30: Joint block
50: Rail member
55: Guide portion
55f: Receiving surface (alignment mechanism)
56: Through hole
57: Screw hole
110A: Open-close valve (2-way valve) (fluid device)
110B: Regulator (fluid device)
110C: Pressure gauge (fluid device)
110D: Open-close valve (3-way valve) (fluid device)
110E: Mass flow controller (fluid device)
111: Actuator built-in portion
112: Valve built-in portion
113: Body
113a: Upper surface 113b: Bottom surface
114: Through hole
116: Holding recess
117: Fluid flow path
117a: Flow path port
120: Gasket
150: Closing member
200: Assembly
300: Joint member
310: Introduction pipe
320: Communicating pipe
330: Communicating pipe
340: Supply pipe
400: Stopper
500: Plunger
501: Ball roller body
502: Spring
503: Casing
504: Flange
505: C-ring
506: Main ball
507: Sub-ball
508: Spacer
510: Tip end portion
BT: Fastening bolt
BT2: Fastening bolt
g, G: Gap
G1, G2: Longitudinal direction
W1, W2: Width direction

The invention claimed is:

1. A fluid control device comprising:
a joint block defining an upper surface and a bottom surface opposing each other, side surfaces extending from the upper surface toward the bottom surface side, defining a fluid flow path which is open to the upper surface, and having an engaging portion on the bottom surface side;
a support member having a guide portion that extends linearly in a longitudinal direction adapted to be engaged with the engaging portion of the joint block, and restraining the joint block on an upper surface while allowing the joint block to move in the longitudinal direction by the guide portion; and
a fluid device having at least two flow path ports that open on a bottom surface of the fluid device and fixed to the upper surface of the joint block so that the flow path ports are each connected to the fluid flow path of the joint block,
wherein the support member is provided with at least one plunger so that a tip end portion of the plunger protrudes from the upper surface of the support member, a recess is provided in the bottom surface of the joint block, and the recess is engaged with the tip end portion of the plunger to set a position of the joint block in the longitudinal direction.

2. The fluid control device according to claim 1, comprising at least two joint blocks, wherein the at least one plunger comprises at least two plungers, with one plunger respectively provided for each joint block, and the joint blocks are positioned with a gap therebetween.

3. The fluid control device according to claim 1, comprising at least two joint blocks, wherein only one plunger is provided on the support member and all of the joint blocks are integrally positioned so that they are in contact with each other.

4. The fluid control device according to claim 1, wherein the plunger is of a ball type.

5. The fluid control device according to claim 1, comprising at least two joint blocks, wherein the fluid device has a body defining fluid flow paths, the body having the two flow path ports opening at its bottom surface,
the joint blocks of an upstream side and a downstream side of the fluid device each has a screw hole formed from the upper surface toward the bottom surface side of the joint block, the screw hole being adapted to be screwed with a fastening bolt for connecting the body to the joint blocks of the upstream side and the downstream side while pressurizing a seal member disposed around each of flow path ports of the joint blocks of the upstream side and the downstream side and each of two flow path ports of the body,
the screw hole of the joint block of the upstream side of the fluid device is formed only on the upstream side of the flow path port of the joint block in the longitudinal direction,
the screw hole of the joint block of the downstream side of the fluid device is formed only on the downstream side of the flow path port of the joint block in the longitudinal direction,
the joint blocks of the upstream side and the downstream side of the fluid device are fixed to the guide portion by utilizing a part of a reaction force against a bending force generated by the tightening force of the fastening bolts to the joint blocks of the upstream side and the downstream side of the fluid device and the body connected to each other.

6. A method for manufacturing a fluid control device comprising: a joint block defining an upper surface and a bottom surface opposing each other, side surfaces extending from the upper surface toward the bottom surface side, defining a fluid flow path which is open to the upper surface, and having an engaging portion on the bottom surface side;
a support member having a guide portion that extends linearly in a longitudinal direction adapted to be engaged with the engaging portion of the joint block, and restraining the joint block on an upper surface of the support member while allowing the joint block to move in the longitudinal direction by the guide portion;
a fluid device having at least two flow path ports that open on a bottom surface of the fluid device and fixed to an upper surface of the joint block so that the flow ports are each connected to the fluid flow path of the joint block,
the method for manufacturing a fluid control device comprising the steps of:
providing at least one plunger on the support member so that a tip end portion protrudes from the upper surface of the support member,
providing a recess on the bottom surface of the joint block,
engaging the recess with the tip end portion of the plunger to set a position of the joint block in the longitudinal direction, and
tightening each joint block with each fluid device in this state.

* * * * *